United States Patent
Kwon et al.

(10) Patent No.: US 9,807,748 B2
(45) Date of Patent: Oct. 31, 2017

(54) SYSTEM AND METHOD FOR INDICATING A PERIODIC RESOURCE ALLOCATION

(71) Applicant: Futurewei Technologies, Inc., Plano, TX (US)

(72) Inventors: Young Hoon Kwon, San Diego, CA (US); Zhigang Rong, San Diego, CA (US)

(73) Assignee: Futurewei Technologies, Inc., Plano, TX (US)

( * ) Notice: Subject to any disclaimer, the term of this patent is extended or adjusted under 35 U.S.C. 154(b) by 127 days.

(21) Appl. No.: 14/316,514

(22) Filed: Jun. 26, 2014

(65) Prior Publication Data

US 2015/0208385 A1     Jul. 23, 2015

Related U.S. Application Data

(60) Provisional application No. 61/928,769, filed on Jan. 17, 2014.

(51) Int. Cl.
| | |
|---|---|
| *H04W 72/04* | (2009.01) |
| *H04W 72/12* | (2009.01) |
| *H04W 74/08* | (2009.01) |
| *H04W 28/06* | (2009.01) |
| *H04W 84/12* | (2009.01) |

(52) U.S. Cl.
CPC ..... *H04W 72/042* (2013.01); *H04W 72/0446* (2013.01); *H04W 72/121* (2013.01); *H04W 72/1289* (2013.01); *H04W 28/06* (2013.01); *H04W 72/0413* (2013.01); *H04W 74/0833* (2013.01); *H04W 84/12* (2013.01)

(58) Field of Classification Search
CPC ............... H04W 72/042; H04W 52/02; H04W 72/0446; H04W 72/121; H04W 72/1289; H04W 74/0833
See application file for complete search history.

(56) References Cited

U.S. PATENT DOCUMENTS

| | | | | |
|---|---|---|---|---|
| 8,582,436 | B2 * | 11/2013 | Zheng | H04W 76/048 370/235 |
| 8,649,390 | B2 * | 2/2014 | Kim | H04W 72/121 370/431 |
| 2013/0128798 | A1 | 5/2013 | Liu | |

(Continued)

OTHER PUBLICATIONS

International Search Report and Written Opinion of Patent Cooperation Treaty (PCT), Application No. PCT/US15/11335, Applicant: Huawei Technologies Co., Ltd., date of mailing Apr. 10, 2015, 9 pages.

(Continued)

*Primary Examiner* — Chandrahas Patel
(74) *Attorney, Agent, or Firm* — Futurewei Technologies, Inc.

(57) ABSTRACT

A method for operating an access point (AP) includes scheduling, by the AP, first resources for a first periodic restricted access window (PRAW), and generating, by the AP, a first PRAW indicator including first information associated with the scheduled first resources for the first PRAW. The method also includes determining, by the AP, a next PRAW indication time in accordance with the first PRAW, and transmitting, by the AP, the first PRAW indicator and the next PRAW indication time in a first frame.

20 Claims, 13 Drawing Sheets

(56) References Cited

U.S. PATENT DOCUMENTS

2013/0336245 A1    12/2013  Fischer
2013/0343305 A1    12/2013  Kwon et al.

OTHER PUBLICATIONS

IEEE P802.11ahtm/D2.0 Draft Standard for Information technology—Telecommunications and information exchange between systems Local and metropolitan area networks—Specific requirements, Part11: Wireless LAN Medium Access Control (MAC) and Physical Layer (PHY) Specifications, Amendment 6: Sub 1 GHz License Exempt Operation, IEEE P802.11ahtm/D2.0, 802.11 Working Group of the LAN/MAN Standards Committee of the IEEE Computer Society, Jun. 2014, 582 pages.

Ghosh, C., "LB 200 Comment Resolution for Clause 9.20.5," IEEE P802.11, Wireless LANs, Jan. 20, 2014, pp. 1-3.

"IEEE P802.11ahtm/D1.0 Draft Standard for Information technology—Telecommuncations and information exchange between systems Local and metropolitan area networks—Specific requirements, Part 11: Wireless LAN Medium Access Control (MAC) and Physical Layer (PHY) Specifications, Amendment 6: Sub 1 Ghz License Exempt Operation," IEEE P802.11ahtm/D1.0, 802.11 Working Group of the LAN/MAN Standards Committee of the IEEE Computer Society, Oct. 2013, 394 pages.

Young Hoon Kwon et al., "PRAW Follow Up," doc: IEEE 802.11-12/0295r0, Mar. 18, 2013, XP068053715. 10 pages.

\* cited by examiner

SYSTEM AND METHOD FOR INDICATING
A PERIODIC RESOURCE ALLOCATION

This application claims the benefit of U.S. Provisional Application No. 61/928,769, filed on Jan. 17, 2014, entitled "System and Method for Indicating Periodic Resource Allocation," which application is hereby incorporated herein by reference.

TECHNICAL FIELD

The present disclosure relates generally to digital communications, and more particularly to a system and method for indicating a periodic resource allocation.

BACKGROUND

IEEE 802.11 Task Group (TG) ah (referred to herein as IEEE 802.11 TGah or simply TGah) accepted a concept of restricted access window (RAW) operation. An access point (AP) allocates a medium access interval called RAW for a group of stations (STAs) within a beacon interval and broadcast this information using a (Short) Beacon frame. Within a (short) beacon frame, RAW allocation information is indicated in a RAW parameter set (RPS) element. This restricts channel access to a small number of STAs and spreads their access attempts over a much longer period of time. It also improves the efficiency of the utilization of the medium by reducing collisions. Further, it increases fairness by assigning restricted channel access windows to different groups of STAs.

IEEE 802.11 TGah also accepted a concept of periodic resource allocation, named as a periodic restricted access window (periodic RAW or PRAW). The AP may also indicate the presence of a PRAW allocation by setting the periodic RAW indication subfield to 1 in the RAW control subfield of RAW Assignment field in the RPS element. A STA that receives the RPS element with the PRAW indication subfield set to one in the RAW control subfield of RAW Assignment field obtains information of RAW periodicity in the PRAW periodicity subfield. The periodicity of RAW assignment for a group of STAs indicated in the RAW group subfield of the RAW assignment field of RPS element is valid for a fixed number of periods indicated in the PRAW validity subfield of the periodic operation parameters subfield in the RAW assignment field of RPS element.

SUMMARY OF THE DISCLOSURE

Example embodiments of the present disclosure which provide a system and method for indicating a periodic resource allocation.

In accordance with an example embodiment of the present disclosure, a method for operating an access point (AP). The method includes scheduling, by the AP, first resources for a first periodic restricted access window (PRAW), and generating, by the AP, a first PRAW indicator including first information associated with the scheduled first resources for the first PRAW. The method also includes determining, by the AP, a next PRAW indication time in accordance with the first PRAW, and transmitting, by the AP, the first PRAW indicator and the next PRAW indication time in a first frame.

In accordance with another example embodiment of the present disclosure, an access point is provided. The access point includes a processor, and a transmitter operatively coupled to the processor. The processor schedules first resources for a first periodic restricted access window (PRAW), generates a first PRAW indicator including first information associated with the scheduled first resources for the first PRAW, and determines a next PRAW indication time in accordance with the first PRAW. The transmitter transmits the first PRAW indicator and the next PRAW indication time in a first frame.

In accordance with another example embodiment of the present disclosure, a communications system is provided. The communications system includes a plurality of stations, and an access point. The access point serves the plurality of stations, schedules a first periodic restricted access window (PRAW) for a first subset of the plurality of stations, and indicates the first PRAW and a next PRAW indication time to the plurality of stations.

One advantage of an embodiment is that stations are informed in an efficient manner when subsequent PRAW indications occur so that consistency is maintained.

A further advantage of an embodiment is that ambiguity in identifying already allocated PRAWs is reduced.

BRIEF DESCRIPTION OF THE DRAWINGS

For a more complete understanding of the present disclosure, and the advantages thereof, reference is now made to the following descriptions taken in conjunction with the accompanying drawing, in which.

DETAILED DESCRIPTION OF ILLUSTRATIVE EMBODIMENTS

The operating of the current example embodiments and the structure thereof are discussed in detail below. It should be appreciated, however, that the present disclosure provides many applicable inventive concepts that can be embodied in a wide variety of specific contexts. The specific embodiments discussed are merely illustrative of specific structures of the disclosure and ways to operate the disclosure, and do not limit the scope of the disclosure.

One embodiment of the disclosure relates to indicating a periodic resource allocation. For example, an AP schedules first resources for a first periodic restricted access window (PRAW), and generates a first PRAW indicator including first information associated with the scheduled first resources for the first PRAW. The AP also determines a next PRAW indication time, and transmits the first PRAW indicator and the next PRAW indication time in a first frame.

The present disclosure will be described with respect to example embodiments in a specific context, namely an IEEE 802.11 TGah compliant communications system that uses restricted access windows and a variety of PRAW indication techniques. The disclosure may also be applied, however, to other standards compliant, such as The Third Generation Partnership Project (3GPP) or other 802.11 technical standards, and non-standards communications systems that uses restricted access windows and a variety of restricted access window indication techniques.

Figure 1:
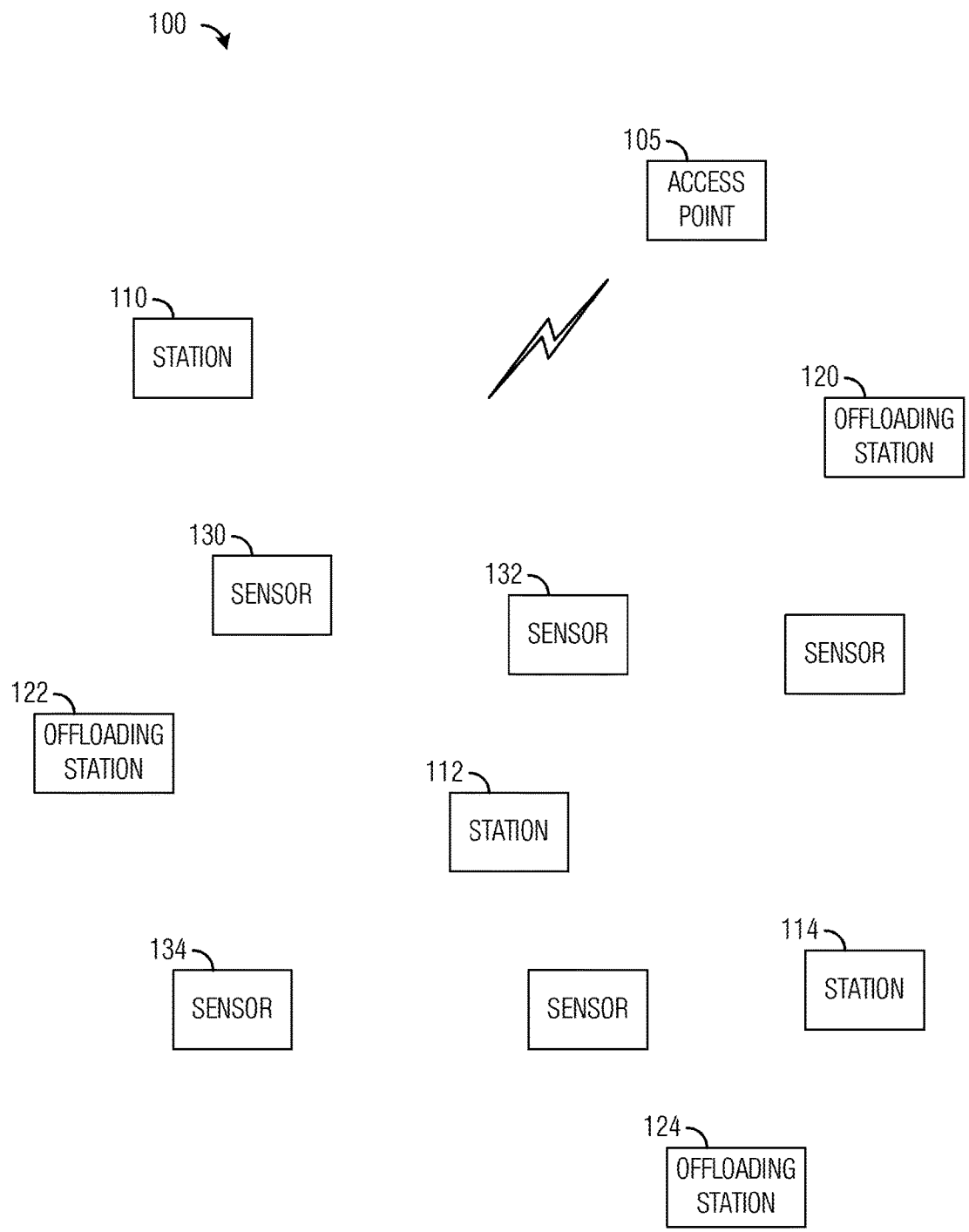
FIG. 1 illustrates an example communications system according to example embodiments described herein.

FIG. 1 illustrates an example communications system 100. It is noted that communications system 100 may also be referred to as a wireless LAN (WLAN) basic service set (BSS). Communications system 100 includes an access point (AP) 105, an example of a communications controller, serving a plurality of stations (an example of communications devices). The plurality of stations may include typical stations, such as stations 110 through 114, and may include personal computers, laptops, tablets, multi-media servers, and the like. The plurality of stations may also include offloading stations, such as offloading stations 120 through 124, and may include stations that typically access services through other access networks. Examples offloading stations include cellular telephones, user equipment, and the like. The plurality of stations may also include sensors, such as sensors 130 through 134. In general, sensors are used to gather information, such as weather information, security information, position information, health information, safety information, performance information, and the like. The sensors may transmit the information through access point 105 to a server or an information aggregator. The sensors may also aggregate the information prior to transmitting the information.

While it is understood that communications systems may employ multiple access points capable of communicating with a number of stations, only a limited number of access points and stations are illustrated for simplicity.

Figure 2:
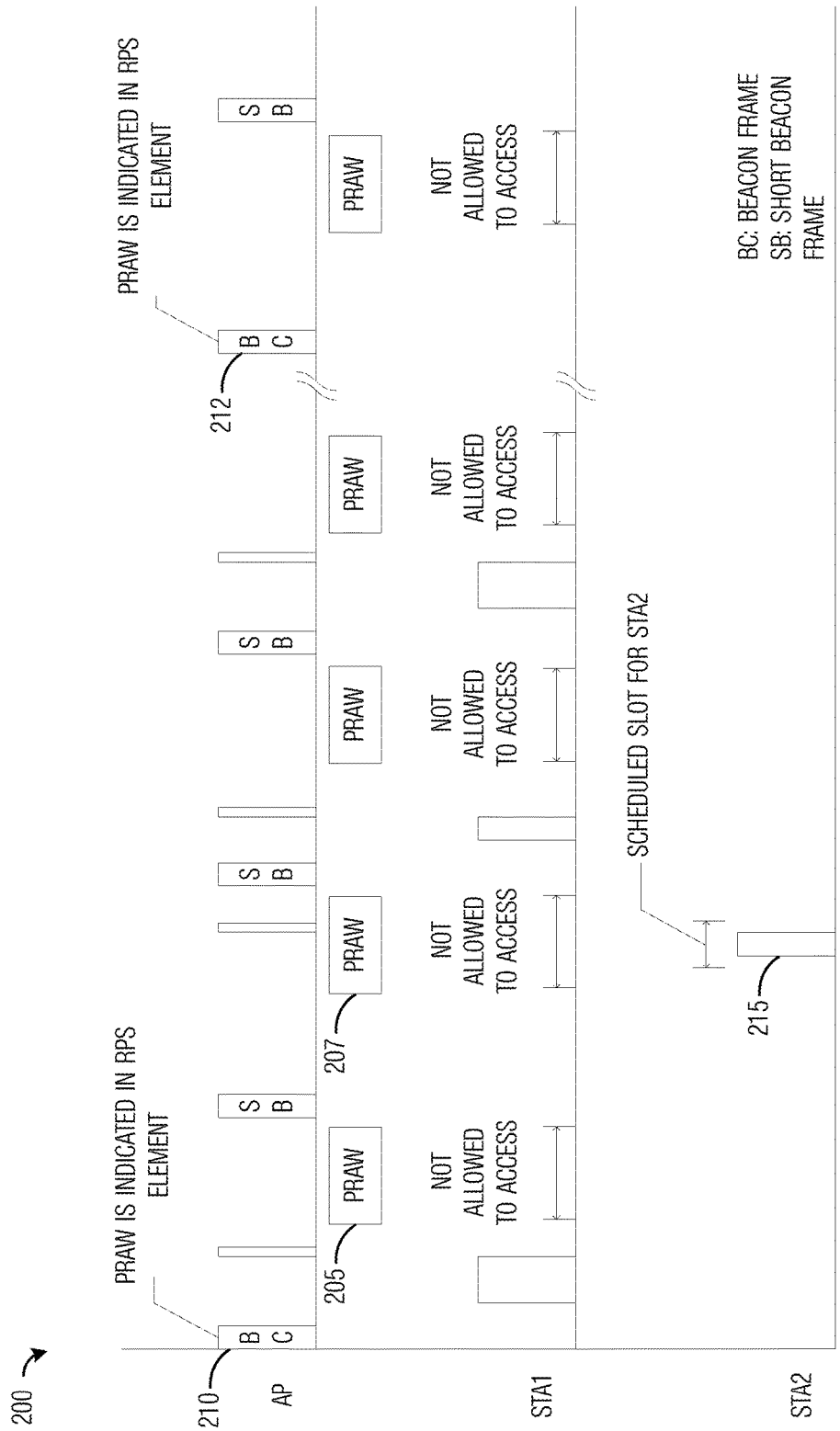
FIG. 2 illustrates a diagram of example prior art PRAW operation.

FIG. 2 illustrates a diagram 200 of example prior art PRAW operation. STA2 is included in the PRAW allocation but STA1 is not. An AP allocates resources for PRAWs at every short beacon frame, such as PRAW 205, PRAW 207, and the like, but the AP indicates the PRAW allocation only at every beacon frame, e.g., beacon 210 and beacon 212. Once STA1 receives PRAW indication (e.g., in beacon 210), STA1 will not access the channel where and when the PRAWs are allocated. Even though the PRAW allocation is not indicated at every short beacon frame that PRAW is assigned, STA1 will not access the channel where and when the PRAWs are allocated at every short beacon period. However, STA2 is included in the PRAW allocation, therefore, STA2 can transmit during a PRAW, such as transmission 215 during PRAW 207.

Figure 3:
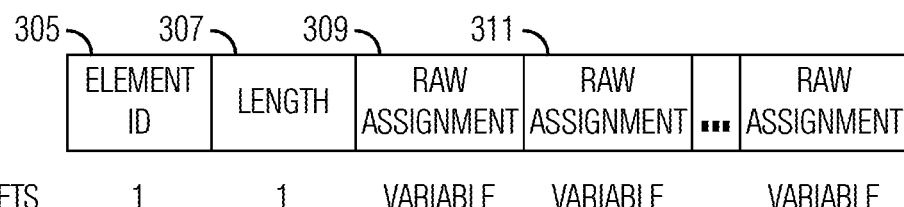
FIG. 3 illustrates an example RAW parameter set (RPS) element according to example embodiments described herein.

FIG. 3 illustrates an example RAW parameter set (RPS) element 300. RPS element 300 may include an Element Identifier (Element ID) field 305, a Length field 307, and a variable number of RAW Assignment fields, such as RAW Assignment field 309 and RAW Assignment field 311. A value in Element ID field 305 indicates that this is a RPS element and a value in Length field 307 indicates the length of RPS element 300. Each RAW Assignment field contains information specifying an allocated RAW or PRAW. In other words, the RAW Assignment fields, contain information regarding RAW assignments.

Figure 4:
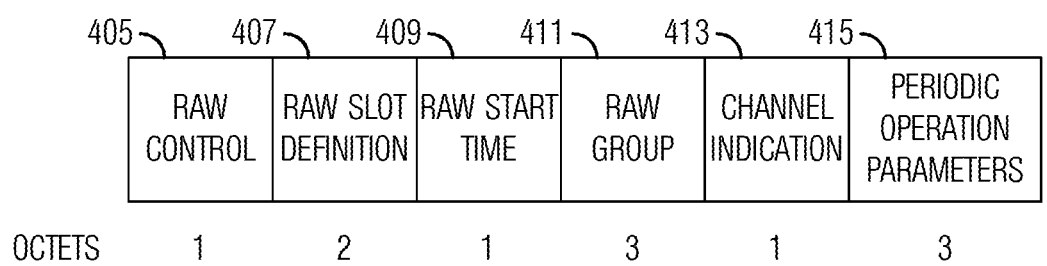
FIG. 4 illustrates an example RAW assignment according to example embodiments described herein.

FIG. 4 illustrates an example RAW assignment 400. RAW assignment 400 may include a RAW Control field 405, a RAW Slot Definition field 407, a RAW Start Time field 409, a Channel Condition field 411, and a Periodic Operation Parameters field 415. RAW Control field 405 may include information used in defining RAW types, start time indication, channel indication presence, as well as PRAW indication. RAW Slot Definition field 407 may include information defining slot duration and/or slot number configuration, cross-slot boundary, slot duration count, number of slots, and the like. RAW Start Time field 409 may include information indicating the duration from the end of a frame that includes the RPS element comprising RAW assignment 400 to the start time of the RAW as defined in RAW assignment 400. RAW Group field 411 may include information such as station association identifier(s) (AID(s)) that are allowed access within the RAW as defined in RAW assignment 400. Channel Condition field 413 may include information that indicate allowed operating channels.

Periodic Operation Parameters field 415 may include PRAW specific information: PRAW periodicity—period of current PRAW occurrence; PRAW validity—number of periods that the PRAW repeats; and PRAW start offset—offset value from the frame that carries the PRAW indication to the (Short) Beacon frame where the first window of the PRAW appears.

Although 802.11 TGah defines a procedure for PRAW allocation, it is generally not clear how to update or modify currently scheduled PRAW information. Currently, an AP can send PRAW information at any (Short) Beacon frame or probe response frame. However, since PRAW allocations are not indicated at every (Short) Beacon frame that a PRAW allocated, it is possible that some stations will miss the PRAW indication.

Figure 5:
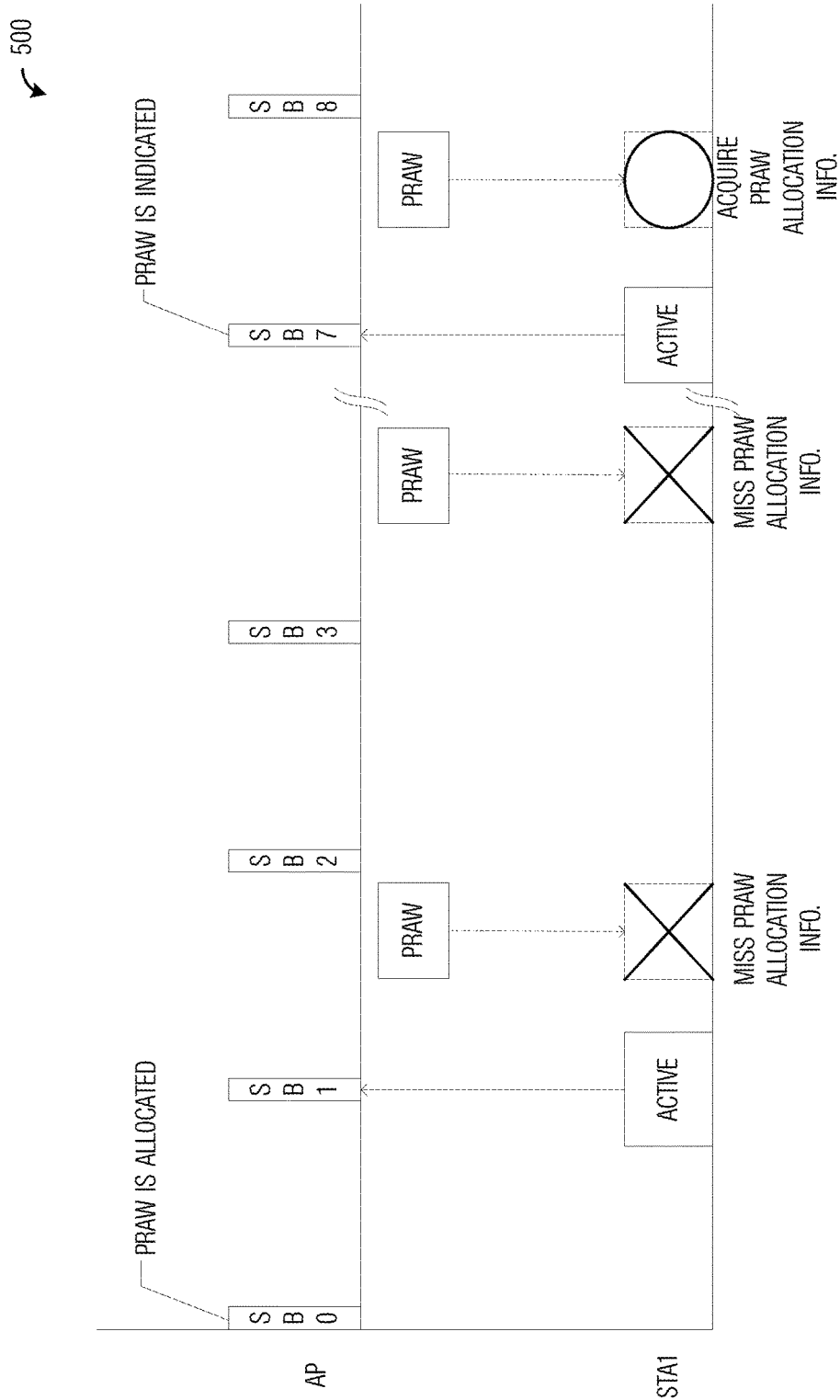
FIG. 5 illustrates a diagram of an example prior art PRAW allocation and associated signaling.

FIG. 5 illustrates a diagram 500 of an example prior art PRAW allocation and associated signaling. As shown in diagram 500, an AP allocates and broadcasts a PRAW indication in Short Beacon 0 (SB0) and Short Beacon 7 (SB7), with the PRAW being allocated starting at SB1 for every other SB, e.g., the PRAW is allocated for SB1, SB3, SB5, SB7, and the like. As shown in diagram 500, station 1 (STA1) is active at SB1 and finds no PRAW allocation information, therefore, STA1 misses the PRAWs in SB1, SB3, and SB5. When STA1 becomes active at SB7, it finds PRAW allocation information and is able to make use of the PRAW in SB7 and potentially subsequent odd numbered Short Beacons as long as the AP maintains the PRAW allocation. Therefore, there is no guarantee that PRAW indications are received by stations operating within the coverage area of the AP.

Currently, 802.11 TGah when an AP transmits a PRAW indication, it does not include information about other allocated PRAWs. In such a situation when an AP allocates multiple PRAWs and indicates these PRAW allocations in different Short Beacon frames, some stations may receive part of the allocated PRAW information and miss some PRAW information unless the stations receive every Short Beacon frame. In other words, some stations may receive allocation information for some of the PRAWs but miss allocation information for some of the other PRAWs unless the stations receive every Short Beacon frame. Furthermore, in a situation when the AP modifies an already allocated PRAW, it is not clear how to update current PRAW allocation information using RPS elements.

According to an example embodiment, in a situation when there are multiple PRAWs allocated within a single BSS, all allocated PRAW information is included in one message regardless of each PRAW period or group of stations allocated within each PRAW. By including all allocated PRAW information in one message, each station is able to identify PRAW resource allocations of all frames once the station receives a Short Beacon frame including the RPS element with PRAW information.

Figure 6:
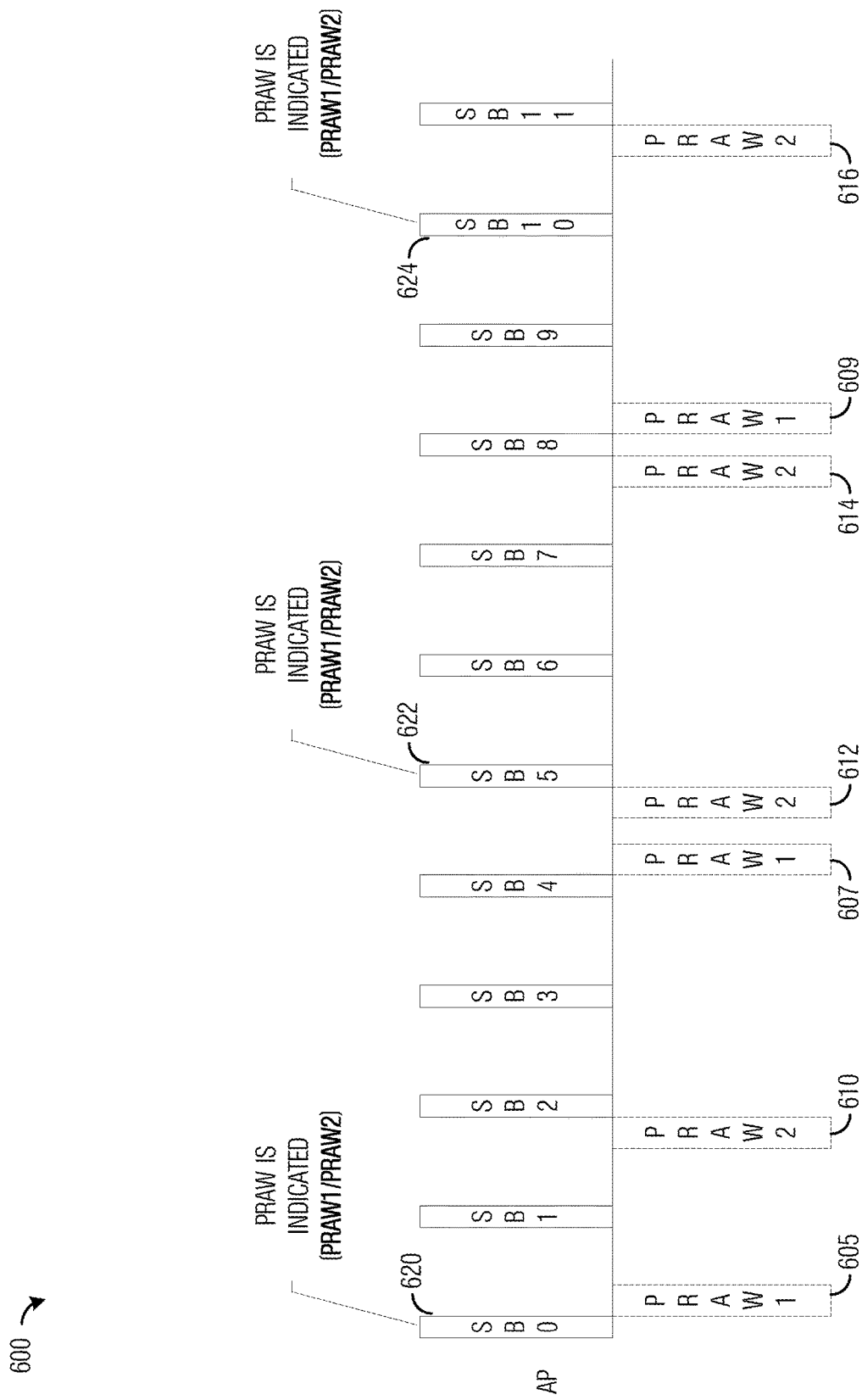
FIG. 6 illustrates a diagram of example PRAW allocations and associated signaling, where all allocated PRAW information is included in one message according to example embodiments described herein.

FIG. 6 illustrates a diagram 600 of example PRAW allocations and associated signaling, where all allocated PRAW information is included in one message. As shown in diagram 600, the AP has two PRAW allocations: PRAW1 allocated at Short Beacon 0 (SB0) and shown as block 605, Short Beacon 4 (SB4) and shown as block 607, Short Beacon 8 (SB8) and shown as block 609, and the like; and PRAW2 allocated at Short Beacon 1 (SB1) and shown as block 610, Short Beacon 4 (SB4) and shown as block 612, Short Beacon 7 (SB7) and shown as block 614, Short Beacon 10 (SB10) and shown as block 616, and the like. Furthermore, the AP transmits allocation information for the two PRAWs every fifth Short Beacon frame (e.g., SB0 (shown as block 620), SB5 (shown as block 622), SB10 (shown as block 624), and the like), with the Short Beacons at SB0, SB5, SB10, and the like, including allocation information for both PRAW 1 and PRAW 2.

According to an example embodiment, an AP informs its associated stations when the AP will send a "PRAW indication time". The PRAW indication time may be broadcast using (Short) Beacon frames periodically and also can be unicasted when a station associates with the AP. If the PRAW indications are done in periodic fashion, PRAW indication time information includes PRAW indication period, and (optionally) an offset to the first PRAW indication. The PRAW indication period implies a period that PRAW indications are made. The units of the PRAW indication period may be in Short Beacon periods. Offset to first PRAW indication implies a time from current frame that indicates the PRAW indication time to the frame that includes the first PRAW indication. The units of the offset to the first PRAW indication may be in Short Beacon periods.

As mentioned previously, in case there are multiple PRAWs allocated within a BSS, all allocated PRAW information is included in one message regardless of each PRAW period or group of stations allocated to each PRAW. This information is indicated in each PRAW indication time. If an AP needs to modify an already-allocated PRAW, such as its period, group of stations allocated within the PRAW, PRAW duration, and the like, the AP is not allowed to modify prior to the next PRAW indication time.

If each PRAW indication includes a PRAW validity subfield, which defines the number of periods that the PRAW repeats, then when the PRAW is indicated at the PRAW indication time, the PRAW validity value is equal to or greater than the number of periods that the PRAW repeats until the next PRAW indication time.

If each PRAW indication includes a PRAW validity subfield, which defines the number of periods that the PRAW repeats, and if an AP maintains currently allocated PRAW for longer than the time that indicated in PRAW validity subfield, the AP can extend the PRAW validity value at the PRAW indication time that occurs before the PRAW validity value currently indicated expires.

If each PRAW indication includes a PRAW validity subfield, which defines the number of periods that the PRAW repeats, the PRAW validity subfield may include a state that does not specify an exact number of periods that the PRAW repeats.

An AP may transmit another PRAW indication message before next scheduled PRAW indication time. However, at the scheduled PRAW indication time, the AP tries to send a PRAW indication. Even though the AP tries to send the PRAW indication, if the wireless channel does not allow it, for example the wireless channel is busy, the AP may delay or skip the scheduled transmission.

When a station associates to an AP, the station acquires the PRAW indication time. PRAW indication time can be included in a Beacon frame, a probe response frame, an association response frame, or a re-association response frame.

When the PRAW indication time information is changed, the AP may indicate that network information is updated. This indication can be accomplished by increasing a change sequence value in the Short Beacon frame.

Figure 7:
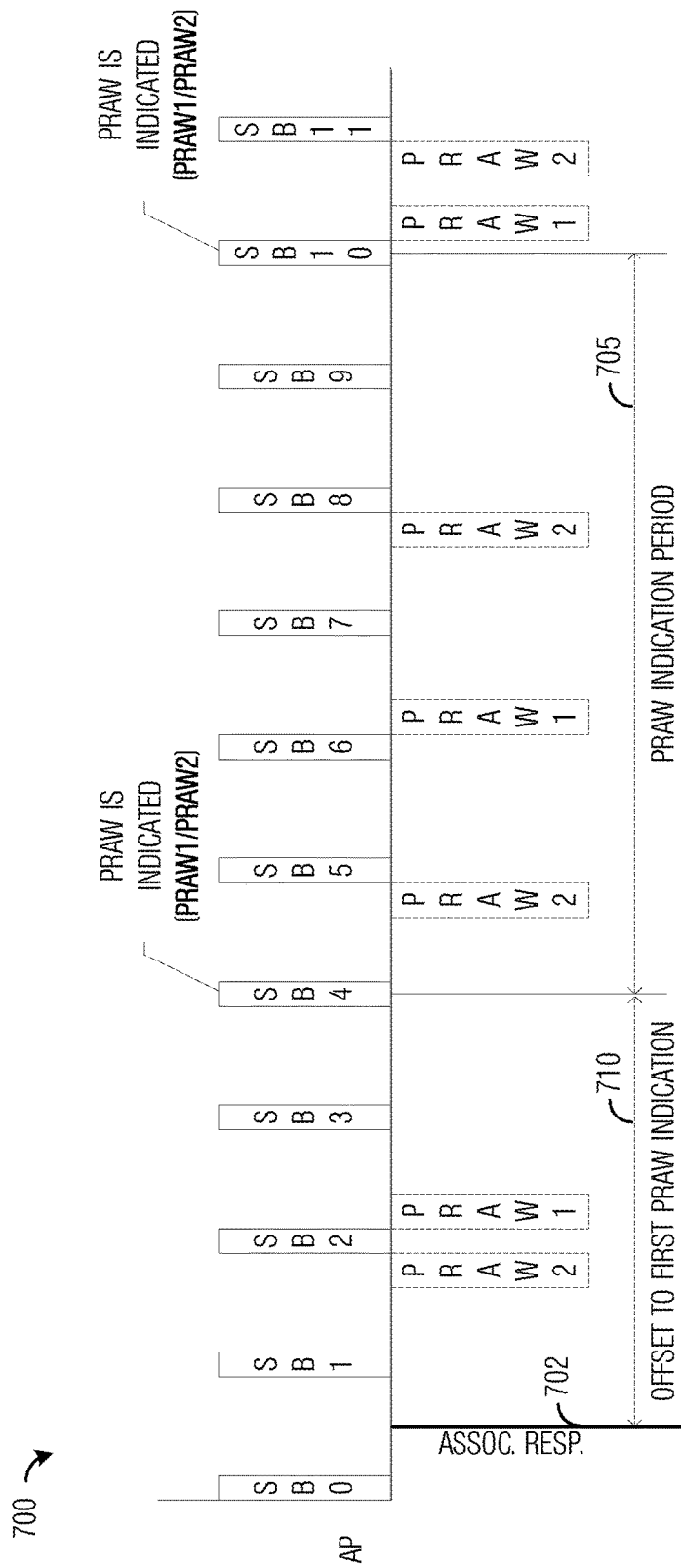
FIG. 7 illustrates a diagram example PRAW allocations and associated signaling, where a PRAW indication time is utilized according to example embodiments described herein.

FIG. 7 illustrates a diagram 700 example PRAW allocations and associated signaling, where a PRAW indication time is utilized. The AP has two PRAW allocations: PRAW1 allocated at SB2, SB6, SB10, SB14, and the like; and PRAW2 allocated at SB1, SB4, SB7, SB10, and the like. When station 1 (STA1) associates to the AP between SB0 and SB1, the AP sent the PRAW indication time information in an association response frame (shown as event 702). As shown in FIG. 7, the PRAW indication period is 6 (shown as highlight 705), and the offset to first PRAW indication is 4 (shown as highlight 710).

According to an example embodiment, in a situation when there are multiple PRAWs allocated within a BSS, all allocated PRAW information is included in one message regardless of PRAW period, group of stations allocated within each PRAW, and the like, and this information is indicated at each PRAW indication time. For each PRAW, whenever it is indicated, the Assignment field of the RPS element includes:
  PRAW periodicity: the period of current PRAW occurrence;
  PRAW start offset: the offset value from the frame that carries the PRAW information to the (Short) Beacon frame that the first window of the PRAW appears; and
  PRAW validity: the number of periods that the PRAW repeats.

If there is only one PRAW allocated for an AP, the next PRAW indication happens at the (Short) Beacon frame that the earliest out of the last period of all PRAWs follow. In other words, the next PRAW indication occurs before the end of the PRAW. The last period of the PRAW may be identified by parsing the PRAW periodicity, PRAW validity, and PRAW start offset subfields included in the PRAW indication.

If there are multiple PRAWs allocated for an AP, the next PRAW indication occurs at the (Short) Beacon frame that the earliest out of the last period of all PRAWs follow. If the current PRAW indication is broadcasted by a (Short) Beacon frame, and earliest (Short) Beacon frame is the current (Short) Beacon frame, the next PRAW indication occurs at the (Short) Beacon frame excluding the current (Short) Beacon frame that the earliest out of the last period of all PRAWs follow. In other words, the next PRAW indication occurs before the end of the shortest PRAW.

An AP may transmit another PRAW indication message before the next scheduled PRAW indication. However, at the scheduled PRAW indication time, the AP tries to send a PRAW indication. Even though the AP tries to send the PRAW indication, if the wireless channel does not allow it, for example the wireless channel is busy, the AP may delay or skip the scheduled transmission.

When an AP terminates a scheduled PRAW, it indicates it at the (Short) Beacon frame that the last period of the PRAW follows (i.e., before the end of the scheduled PRAW being terminated). For this PRAW, the PRAW validity subfield is set to one.

When an AP has at least one PRAW scheduled and needs to add a new PRAW allocation, the new PRAW allocation may be indicated at the (Short) Beacon frame that can be identified based on PRAW validity subfields of ongoing PRAWs.

The PRAW validity subfield may include a state that does not specify the exact number of periods that the PRAW repeats. The next PRAW indication is calculated from those PRAWs whose PRAW validity subfield is different from this state (does not specify the exact number of periods that the PRAW repeats). If all PRAWs in the indication have the PRAW validity subfield with this state, the AP may send the next PRAW indication at any (Short) Beacon frame, or alternatively the AP sends the next PRAW indication at a predetermined period.

Figure 8:
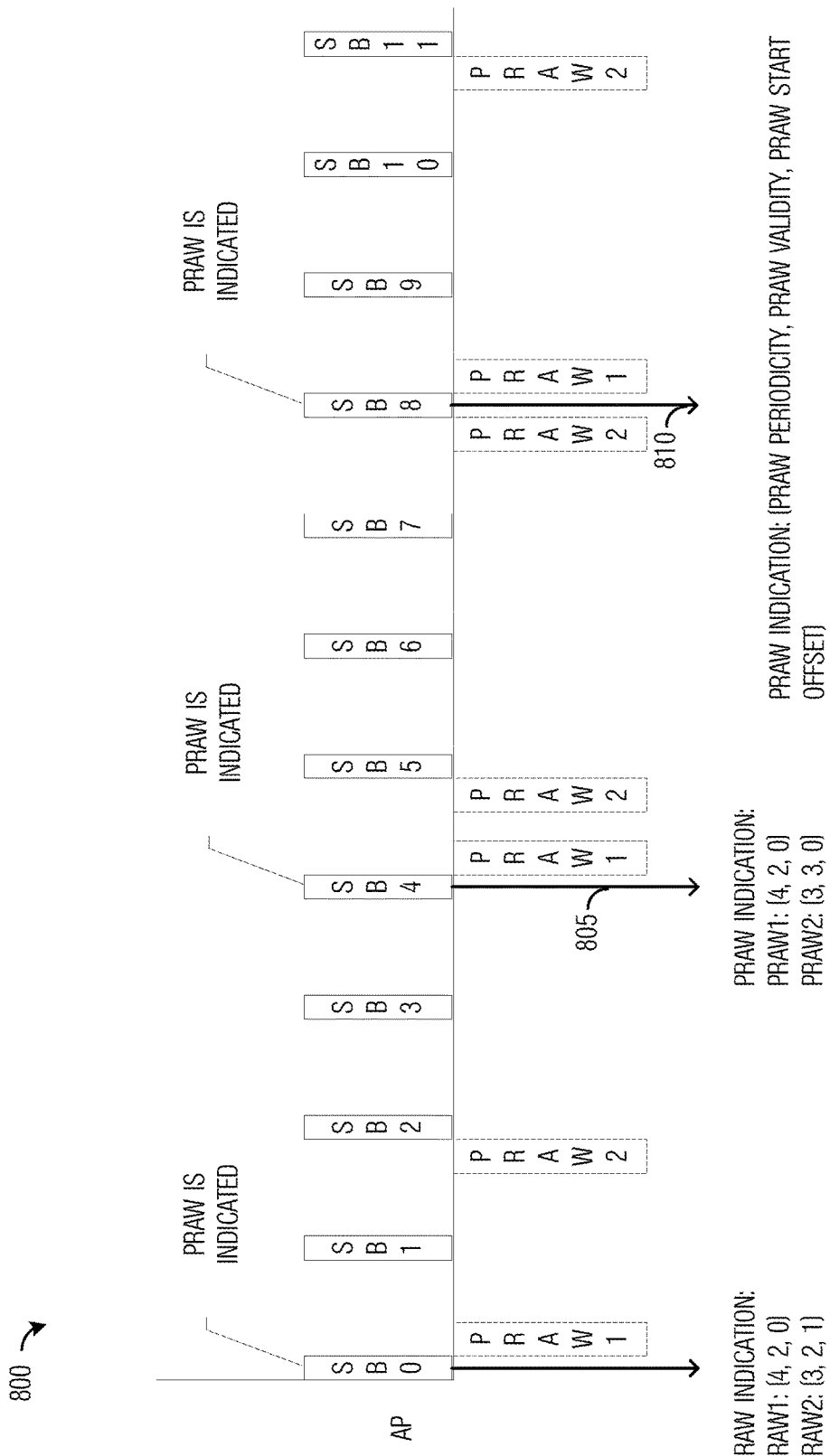
FIG. 8 illustrates a diagram of example PRAW allocations and associated signaling, where a PRAW validity subfield is being utilized according to example embodiments described herein.

FIG. 8 illustrates a diagram 800 of example PRAW allocations and associated signaling, where a PRAW validity subfield is being utilized. The AP has two PRAW allocations: PRAW1 allocated at SB0, SB4, SB8, SB12, and the like; and PRAW2 allocated at SB1, SB4, SB7, SB10, and the like. The AP sets the PRAW validity subfield for each PRAW such that PRAW indication occurs at every 4 SB frames (SB0, SB4, SB8, and the like). At SB0, the last period of both PRAW1 and PRAW2 are supposed to follow SB4. Therefore, the next PRAW indication occurs at SB4 (shown as event 805). At SB4, the last period of PRAW1 follows SB8 and the last period of PRAW2 follows SB10. Therefore, the next PRAW indication occurs at the earlier of SB8 and SB10, which is SB8 (shown as event 810). The process continues.

Figure 9:
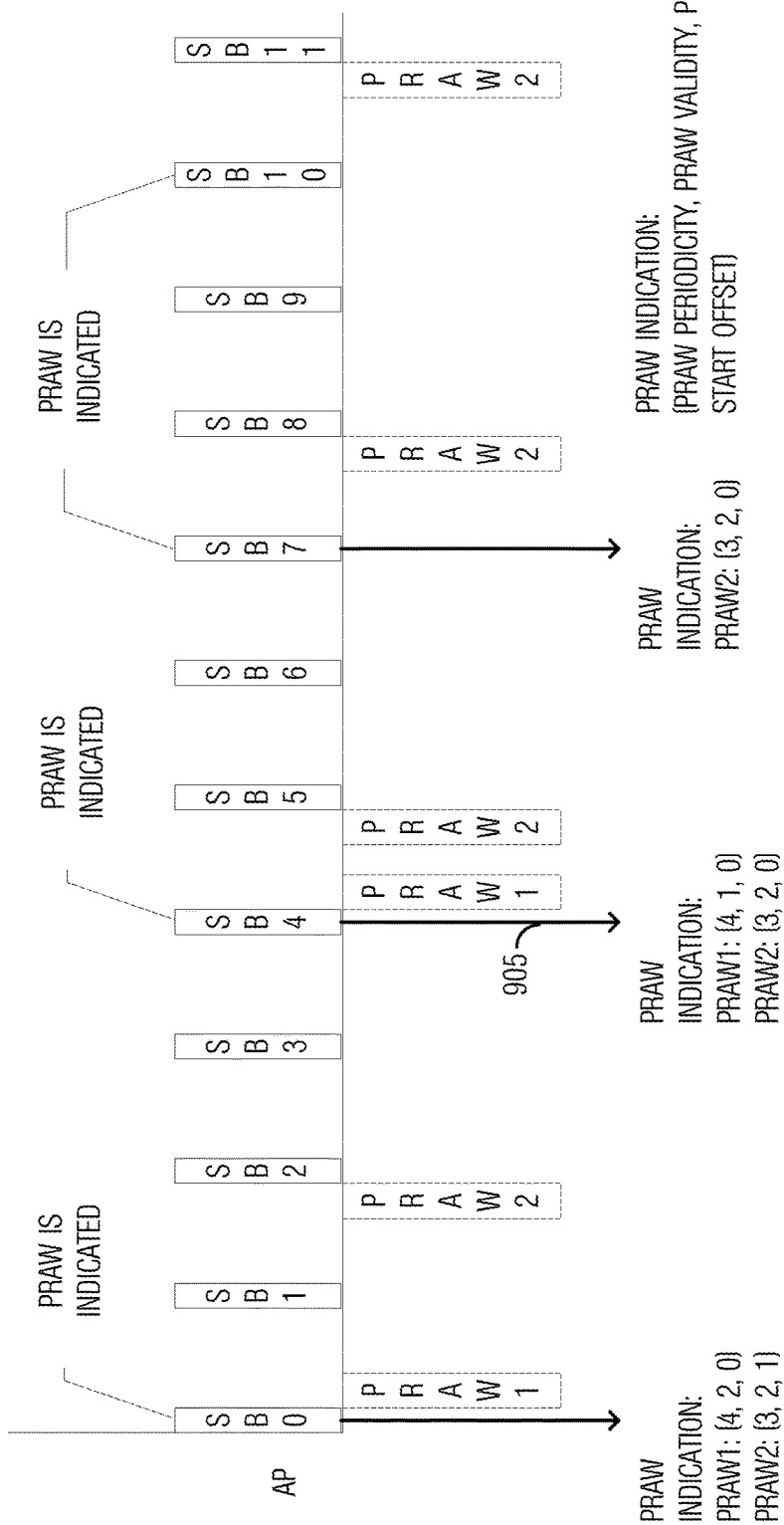
FIG. 9 illustrates a diagram of example PRAW deletions and associated signaling, where a PRAW validity subfield is being utilized according to example embodiments described herein.

FIG. 9 illustrates a diagram 900 of example PRAW deletions and associated signaling, where a PRAW validity subfield is being utilized. The AP has two PRAW allocations: PRAW1 allocated at SB0, SB4, SB8, SB12, and the like; and PRAW2 allocated at SB1, SB4, SB7, SB10, and the like. The AP may need to delete PRAW1 after the PRAW allocation at SB4 (shown as event 905). At SB4, the AP sets PRAW validity for PRAW1 to 1, which indicates that the period that follows SB4 is the last period of PRAW1. This implies that PRAW1 will not repeat again, so PRAW1 is deleted. After SB4, the only remaining PRAW is PRAW2. Hence PRAW indications are tied to PRAW2 only.

Figure 10:
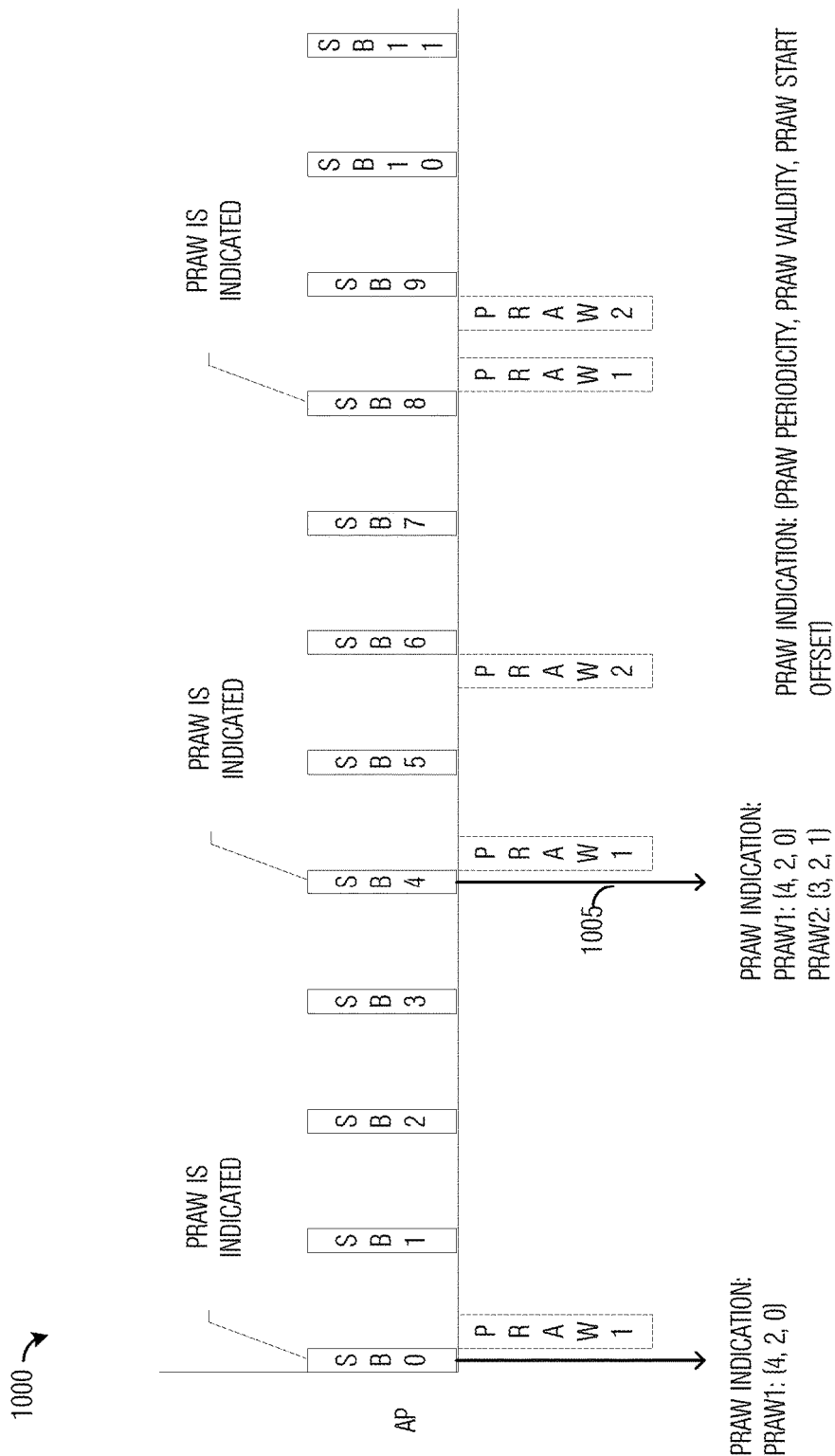
FIG. 10 illustrates a diagram of example PRAW additions and associated signaling, where a PRAW validity subfield is being utilized according to example embodiments described herein.

FIG. 10 illustrates a diagram 1000 of example PRAW additions and associated signaling, where a PRAW validity subfield is being utilized. The AP has one PRAW allocation, PRAW1 allocated at SB0, SB4, SB8, SB12, and the like. The AP may need to add PRAW2 with the periodicity of 3 from SB5. At SB0, PRAW indication includes PRAW1 information only. Based on the PRAW indication at SB0, the next PRAW indication occurs at SB4 (shown as event 1005). Therefore, the AP may indicate the allocation of the new PRAW (PRAW2) at SB4, although PRAW2 itself starts at SB5. At SB4, the AP includes both PRAW1 information and PRAW2 information.

Figure 11:
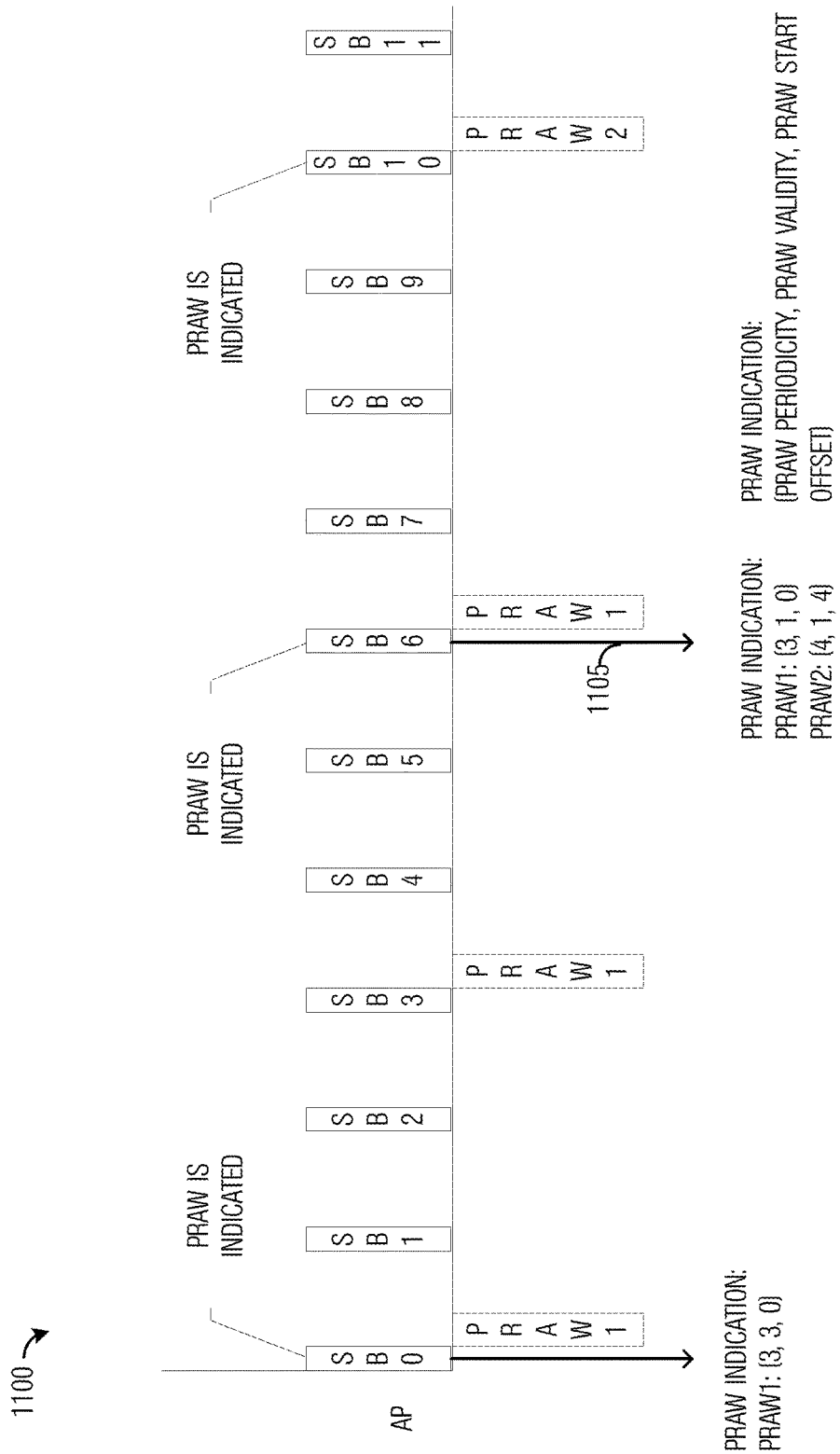
FIG. 11 illustrates a diagram of example PRAW modification and associated signaling, where a PRAW validity subfield is being utilized according to example embodiments described herein.

FIG. 11 illustrates a diagram 1100 of example PRAW modification and associated signaling, where a PRAW validity subfield is being utilized. The AP has one PRAW allocation, PRAW1 allocated at SB0, SB3, SB6, SB9, and the like. The AP may need to modify the periodicity of PRAW1 from 3 to 4 from SB6. At SB0, the AP sets PRAW validity to 3 so that the next PRAW indication occurs at SB6 (shown as event 1105). At SB6, the AP indicates that i) PRAW1 terminates at the current SB period and ii) a new PRAW (PRAW2) with modified parameter is added, starting from the next indication interval.

In accordance with an example embodiment, at each PRAW indication, the PRAW information includes a subfield indicating a time to a next PRAW indication. Currently assigned PRAW is not modified before the time that is indicated in the time to next PRAW indication. An AP may transmit another PRW indication message before the time indicated in the time to next PRAW indication, however, at the time indicated in the time to next PRAW indication, the AP may try to send a PRAW indication. Although the AP tries to send the PRAW indication, if the wireless channel does not allow it, for example, the wireless channel is busy, the AP may delay or skip the scheduled transmission. When a station receives a PRAW indication, it may determine the next PRAW indication and it can identify that currently indicated PRAW will not be modified at least until the next PRAW indication.

In accordance with an example embodiment, if a station loses track of a scheduled PRAW indication time, it needs to monitor and check every (Short) Beacon frame to determine if it includes a RPS element with a PRAW assignment. Since the PRAW assignment generally occurs once in a long while, it may take a long time and drain a significant amount of the station's battery. To reduce acquiring time for PRAW assignments and reduce battery consumption, the station may directly send a request frame to the AP to retrieve scheduled PRAW assignments. When an AP receives such a request frame, the AP may send a response frame including scheduled RAW assignments in the current beacon frame, all scheduled PRAW assignments, as well as information that can help the station determine the next PRAW indication time. A null data packet (NDP) Probe Request frame may be used for the request frame. A (Short) Probe Response frame may be used for the response frame.

In accordance with an example embodiment, PRAW indication happens at a (Short) Beacon frame containing a delivery traffic indication map (DTIM). Not all (Short) Beacon frames containing DTIM include PRAW indication. As discussed previously, in a situation where there are multiple PRAWs allocated within a BSS, all allocated PRAW information is included in one message regardless of each PRAW period, group of stations allocated within each PRAW, and the like. The closest (Short) Beacon frame including DTIM before any of the last period of schedule PRAWs may include the PRAW indication information.

The example embodiments described herein may efficiently inform stations regarding the occurrence of the next PRAW indication. The example embodiments may reduce ambiguity regarding identifying the already-allocated PRAW schedule. The example embodiments do not increase or minimizes the increase in signaling overhead for PRAW indication. The example embodiments provide sufficient flexibility to cope with the addition, deletion, and/or modification of PRAWs while PRAWs are in active use, i.e., active PRAWs. The example embodiments may be implemented in wireless networks and devices, such as smart phones, tables, sensors, APs, and the like.

Figure 12A:
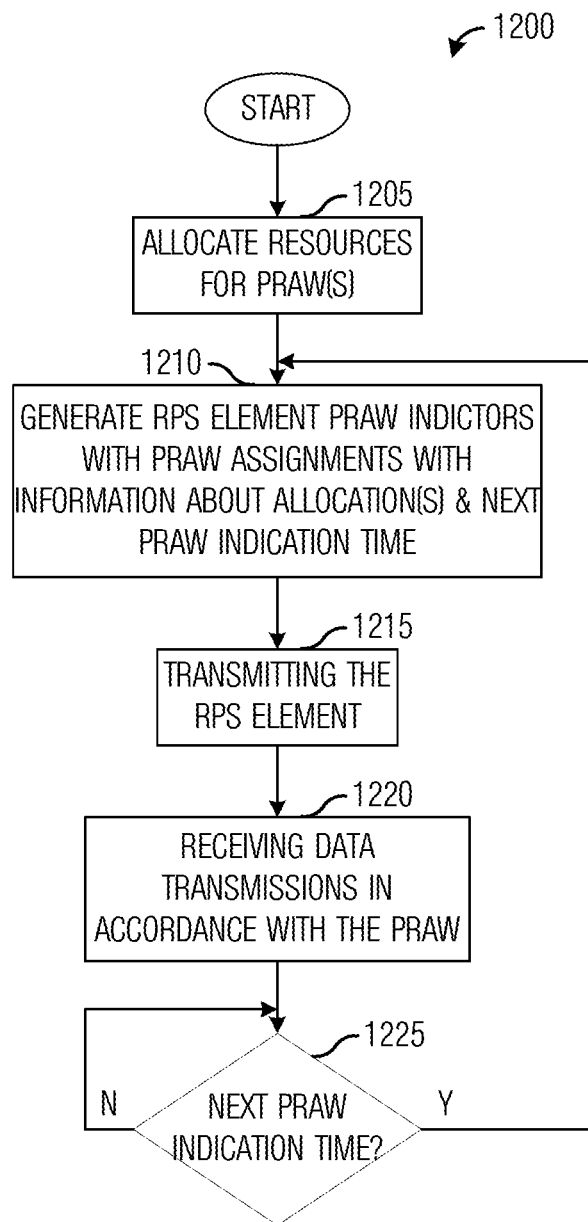
FIG. 12a illustrates a flow diagram of example operations occurring in an AP as the AP indicates PRAWs according to example embodiments described herein.

FIG. 12a illustrates a flow diagram of example operations 1200 occurring in an AP as the AP indicates PRAWs. Operations 1200 may be indicative of operations occurring in an AP, such as AP 105, as the AP indicates PRAWs.

Operations 1200 may begin with the AP allocating resources for a PRAW(s) (block 1205). As discussed previously, the AP may allocate resources for one or more PRAWs from resources of a wireless channel. For each PRAW, the AP may specify a duration of each occurrence of the PRAW, a start time for the PRAW, a period for the PRAW, a number of occurrences of the PRAW, stations that are allowed access to the PRAW, a wireless channel for the PRAW, and the like.

The AP may generate a RPS element for the PRAW(s) (block 1210). The AP may generate a RPS element with a RAW assignment (PRAW indicator) for each of the PRAW (s) that it has just allocated resources, as well as for each active PRAW(s). As an illustrative example, if the AP has allocated resources for two PRAWs and has one active PRAW, the AP generates a RPS element with 3 RAW assignments. Each of the RAW assignments may include information for a particular PRAW. The information may include PRAW periodicity (the period of current PRAW occurrence), PRAW start offset (the offset value from the frame carrying the PRAW assignments (i.e., the RPS element) to a (Short) Beacon frame that preceeds the PRAW, and PRAW validity (the number of periods of the PRAW). The RPS element may also include a next PRAW indication time. The next PRAW indication time is derived from all of the PRAWs (the newly allocated PRAWs as well as the active PRAWs).

The AP may transmit the RPS element (block 1215). The RPS element may be transmitted in a (Short) Beacon frame. The RPS element may be transmitted in a (Short) Beacon frame that includes DTIM information. The RPS element may be transmitted in a (Short) Beacon frame. The RPS element may be transmitted in a Probe Response frame. The RPS element may be transmitted at a next PRAW indication time. The AP may receive data transmissions from stations in accordance with the PRAW(s) (block 1220).

The AP may perform a check to determine if it is the next PRAW indication time (block 1225). As an illustrative example, the next PRAW indication time may be determined as a (Short) Beacon frame, not including the current (Short) Beacon frame, which occurs prior to an earliest last period of current PRAWs. If it is the next PRAW indication time, the AP may send (or attempt to send) a PRAW indication by returning to block 1210 to generate a RPS element that includes RAW assignments for the current PRAWs and transmit the RPS element at the next PRAW indication time. If it is not the next PRAW indication time, the AP may continue to wait until it is the next PRAW indication time. As discussed previously, the AP may send a PRAW indication prior to the next PRAW indication time. The AP may send the PRAW indication in a (Short) Beacon frame or a (Short) Beacon frame that includes DTIM information.

Figure 12B:
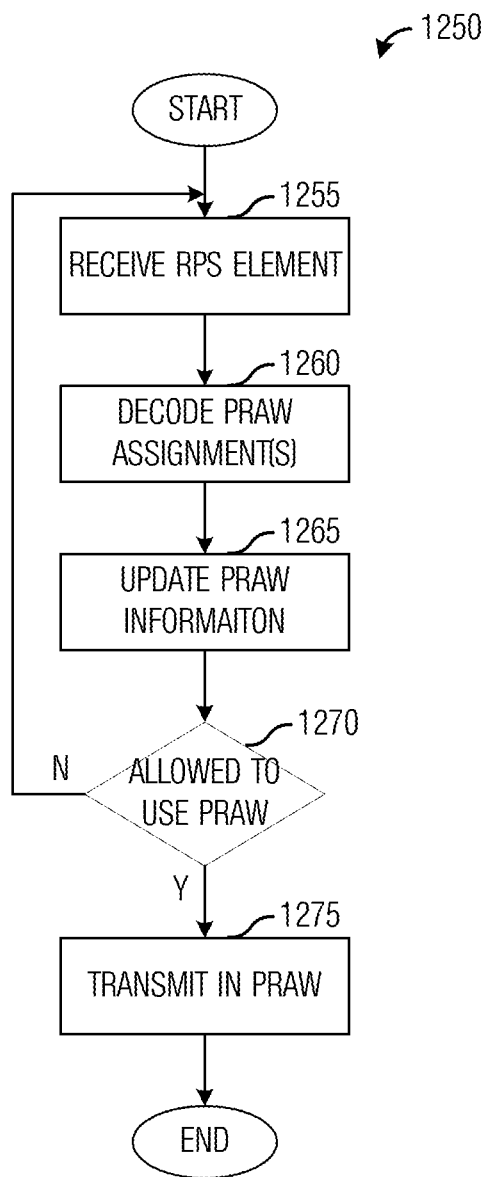
FIG. 12b illustrates a flow diagram of example operations occurring in a station as the station communicates using PRAWs according to example embodiments described herein.

FIG. 12b illustrates a flow diagram of example operations 1250 occurring in a station as the station communicates using PRAWs. Operations 1250 may be indicative of operations occurring in a station, such as stations 110-134, as the station communicates using PRAWs.

Operations 1250 may begin with the station receiving PRAW indicators in a RPS element (block 1255). The RPS element may include one or more PRAW indicators (PRAW assignments) that specify which resources have been assigned to each of the PRAWs, which stations are allowed to use each of the PRAWs, a start time for each of the PRAWs, a period for each of the PRAWs, a wireless channel for each of the PRAWs, and the like. The RPS element may also include a next PRAW indication time, specifying when the station should be expecting another PRAW indication in another RPS element. The station may decode the PRAW indicators (block 1260) and update its PRAW information based on information decoded from the PRAW indicators (block 1265).

The station may perform a check to determine if it is allowed to use any of the PRAWs (block 1270). As an illustrative example, the station may check in the PRAW indicators for information about which stations are allowed to use resources of which PRAW. If the station is allowed to use one or more of the PRAWs, the station may wait until a resource(s) associated with the one or more PRAWs arrives and transmit to an AP in the resource(s) (block 1275).

Figure 13:
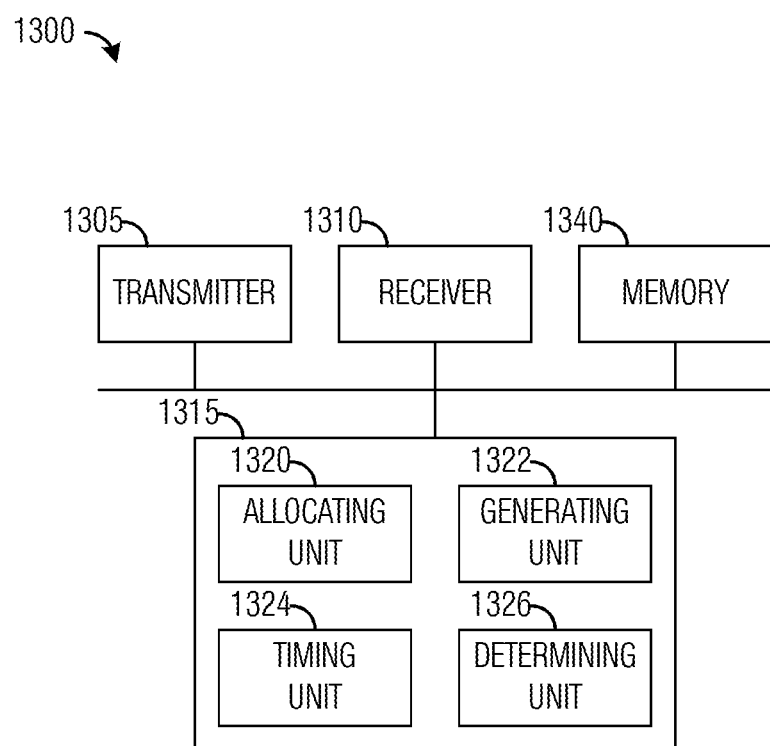
FIG. 13 illustrates an example communications device according to example embodiments described herein.

FIG. 13 illustrates an example communications device 1300. Communications device 1300 may be an implementation of an AP. Communications device 1300 may be used to implement various ones of the embodiments discussed herein. As shown in FIG. 13, a transmitter 1305 is configured to transmit frames, RPS elements, PRAW indications, and the like. Communications device 1300 also includes a receiver 1310 that is configured to receive frames, and the like.

An allocating unit 1320 is configured to allocate resources of a wireless channel for PRAWs. Allocating unit 1320 is configured to specify a duration of each occurrence of the PRAW, a start time for the PRAW, a period for the PRAW, a number of occurrences of the PRAW, stations that are allowed access to the PRAW, a wireless channel for the PRAW, and the like. A generating unit 1322 is configured to generate a RPS element including RAW assignments for each PRAW. A timing unit 1324 is configured to determine a next PRAW indication time. Timing unit 1324 is configured to examine PRAWs to determine the next PRAW indication time. As an example, the next PRAW indication time is determined as a (Short) Beacon frame, not including the current (Short) Beacon frame, which occurs prior to an earliest last period of current PRAWs. A determining unit 1326 is configured to determine if it is time to send a PRAW indication. A memory 1340 is configured to store PRAW allocation information, RPS elements, PRAW assignments, next PRAW indication time, and the like.

The elements of communications device 1300 may be implemented as specific hardware logic blocks. In an alternative, the elements of communications device 1300 may be implemented as software executing in a processor, controller, application specific integrated circuit, or so on. In yet another alternative, the elements of communications device 1300 may be implemented as a combination of software and/or hardware.

As an example, receiver 1310 and transmitter 1305 may be implemented as a specific hardware block, while allocating unit 1320, generating unit 1322, timing unit 1324, and determining unit 1326 may be software modules executing in a microprocessor (such as processor 1315) or a custom circuit or a custom compiled logic array of a field programmable logic array. Allocating unit 1320, generating unit 1322, timing unit 1324, and determining unit 1326 may be modules stored in memory 1340.

Although the present disclosure and its advantages have been described in detail, it should be understood that various changes, substitutions and alterations can be made herein without departing from the spirit and scope of the disclosure as defined by the appended claims.

What is claimed is:

1. A method for operating an access point (AP) which serves a plurality of stations, the method comprising:
    scheduling, by the AP, first resources for a first periodic restricted access window (PRAW) for a first subset of the plurality of stations and second resources for a second PRAW for a second subset of the plurality of stations, the first PRAW to repeat periodically, the second PRAW to repeat periodically;
    determining, by the AP, a next PRAW indication time for a third PRAW, wherein the next PRAW indication time is prior to a last period of the first PRAW and a last period of the second PRAW; and
    transmitting, by the AP, a first frame to indicate the next PRAW indication time.

2. The method of claim 1, wherein the first frame further includes first information associated with the scheduled first resources for the first PRAW, and second information associated with the scheduled second resources for the second PRAW.

3. The method of claim 2, wherein the first information is stored in a first restricted access window (RAW) assignment with a first PRAW indication set to a first value, and wherein the second information is stored in a second RAW assignment with a second PRAW indication set to the first value.

4. The method of claim 2, wherein the first information and the second information are transmitted periodically.

5. The method of claim 2, wherein the first information transmitted in a RAW parameter set (RPS) element of the first frame.

6. The method of claim 2, wherein the first information comprises a PRAW periodicity value, a PRAW validity value, and a PRAW start offset value, wherein the PRAW periodicity value is a period of the first PRAW to repeat periodically, the PRAW validity value is a number of periods that the first PRAW repeats, and the PRAW start offset value is an offset value from the first frame to a second frame that includes a first period of the first PRAW to repeat periodically.

7. The method of claim 1, wherein a lasting time of the first PRAW to repeat periodically overlaps a lasting time of the second PRAW to repeat periodically.

8. The method of claim 1, wherein the first frame comprises one of a Beacon frame, a Beacon frame with a delivery traffic indication map (DTIM), a Short Beacon frame, a Short Beacon frame with the DTIM, or a Probe Response frame.

9. The method of claim 1, wherein determining the next PRAW indication time comprises:
    selecting a frame with a delivery traffic indication map (DTIM) that occurs immediately prior to the last period of the first PRAW and the last period of the second PRAW; and
    setting a time associated with the frame as the next PRAW indication time.

10. The method of claim 1, wherein a PRAW validity value indicates a number of periods that the first PRAW repeats, and wherein the first frame includes the PRAW validity value.

11. The method of claim 10, wherein the method further comprises extending the PRAW validity value prior to expiration of the first PRAW.

12. An access point (AP) serving a plurality of stations, wherein the AP comprising:
    a processor configured to schedule first resources for a first periodic restricted access window (PRAW) for a first subset of the plurality of stations and second resources for a second PRAW for a second subset of the plurality of stations, the first PRAW to repeat periodically, the second PRAW to repeat periodically, and to determine a next PRAW indication time for a third PRAW, wherein the next PRAW indication time is prior to a last period of the first PRAW and a last period of the second PRAW; and
    a transmitter operatively coupled to the processor, the transmitter configured to transmit a first frame to indicate the next PRAW indication time, the transmitter to transmit a next PRAW indication at the next PRAW indication time.

13. The access point of claim 12, wherein the first frame comprises one of a Beacon frame, a Beacon frame with a delivery traffic indication map (DTIM), a Short Beacon frame, a Short Beacon frame with the DTIM, or a Probe Response frame.

14. The access point of claim 12, wherein the processor is configured to select a frame with a delivery traffic indication map (DTIM) that occurs immediately prior to the last period of the first PRAW, and to set a time associated with the frame as the next PRAW indication time.

15. The access point of claim 12, wherein the first frame includes first information associated with the scheduled first resources for the first PRAW and second information associated with the scheduled second resources for the second PRAW.

16. The access point of claim 15, wherein the first information comprises a PRAW periodicity value, a PRAW validity value, and a PRAW start offset value, wherein the PRAW periodicity value is a period of the first PRAW to repeat periodically, the PRAW validity value is a number of periods that the first PRAW repeats, and the PRAW start offset value is an offset value from the first frame to a second frame that includes a first period of the first PRAW to repeat periodically.

17. The access point of claim 15, wherein the transmitter is configured to transmit the first information in a RAW parameter set (RPS) element of the first frame.

18. A communications system comprising:
    a plurality of stations; and
    an access point configured to serve the plurality of stations, to schedule first resources for a first periodic restricted access window (PRAW) for a first subset of the plurality of stations and second resources for a second PRAW for a second subset of the plurality of stations, the first PRAW to repeat periodically, the second PRAW to repeat periodically, and to determine a next PRAW indication time for a third PRAW, and transmit a first frame to indicate the next PRAW indication time, wherein the next PRAW indication time is prior to a last period of the first PRAW and a last period of the second PRAW.

19. The communications system of claim 18, wherein the first frame includes first information associated with the scheduled first resources for the first PRAW and second information associated with the scheduled second resources for the second PRAW.

20. The communications system of claim 18, wherein each station of the plurality of stations is configured to communicate with the access point in accordance with the first PRAW if the station is a member of the first subset of the plurality of stations.

\* \* \* \* \*